Figure 1:
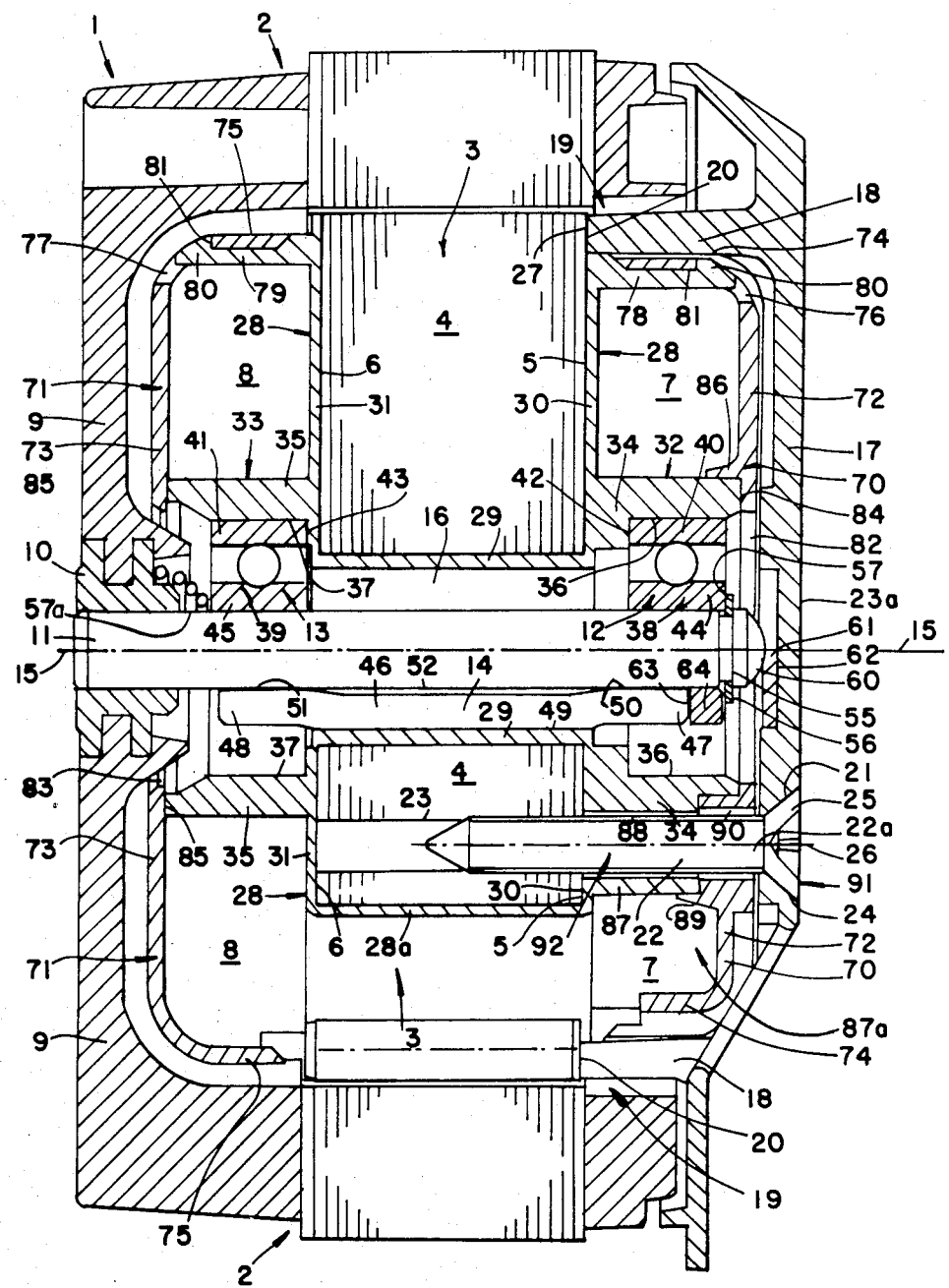

United States Patent [19]

Sturm

[11] Patent Number: 4,634,908
[45] Date of Patent: Jan. 6, 1987

[54] EXTERNAL ROTOR MOTOR WITH SCREWED ON MOTOR FLANGE

[75] Inventor: Gerhard Sturm, Mulfingen, Fed. Rep. of Germany

[73] Assignee: ebm Elektrobau Mulfingen GmbH & Co., Fed. Rep. of Germany

[21] Appl. No.: 744,933

[22] Filed: Jun. 14, 1985

[30] Foreign Application Priority Data

Jun. 19, 1984 [DE] Fed. Rep. of Germany ....... 3422743

[51] Int. Cl.$^4$ .............................................. H02K 5/18
[52] U.S. Cl. ...................................... 310/64; 310/45; 310/67 R; 310/90; 165/185
[58] Field of Search ................. 310/67 R, 90, 216, 91, 310/254, 64, 258, 65, 259, 45, 194; 165/185

[56] References Cited

U.S. PATENT DOCUMENTS

| | | | |
|---|---|---|---|
| 3,777,191 | 12/1973 | Papst | 310/67 R |
| 4,032,807 | 6/1977 | Richter | 310/67 R |
| 4,128,364 | 12/1978 | Papst | 310/67 R |
| 4,322,646 | 3/1982 | Persson | 310/64 |
| 4,508,986 | 4/1985 | Vandamme | 310/67 R |
| 4,538,084 | 8/1985 | Kawada | 310/91 |
| 4,554,473 | 11/1985 | Muller | 310/64 |

FOREIGN PATENT DOCUMENTS

| | | | |
|---|---|---|---|
| 2136170 | 2/1973 | Fed. Rep. of Germany | 310/67 R |
| 2555671 | 6/1976 | Fed. Rep. of Germany | 310/67 R |
| 1613357 | 8/1978 | Fed. Rep. of Germany | 310/67 R |
| 2415890 | 9/1979 | France | 310/67 R |
| 0551765 | 3/1977 | U.S.S.R. | 310/67 R |

Primary Examiner—R. Skudy
Attorney, Agent, or Firm—Jones & Askew

[57] ABSTRACT

External rotor motor for driving ventilators, the motor having an overhung rotor and a stator connected with a motor flange. The stator has a stator winding and stator laminations, and is equipped with an insulating layer made of plastic and sprayed on the stator laminations. The insulating layer extends over the inner side of an axial stator borehole of the stator laminations and, at least in areas, over the front sides of the stator laminations. A rotatable rotor shaft extends through the axial stator borehole, and the rotor shaft is connected with the rotor in a fixed manner on the end opposite the motor flange. At least one metal heat conducting element is provided which, on one end, directly contacts or engages the stator laminations for conducting heat from the limitations and, on the other end, contacts the motor flange for the removal of the heat to the motor flange.

18 Claims, 2 Drawing Figures

EXTERNAL ROTOR MOTOR WITH SCREWED ON MOTOR FLANGE

The invention concerns an external rotor motor, in particular for driving ventilators, with an overmounted rotor and a stator connected with a motor flange, which consists of a stator winding and stator laminations and in particular is equipped with an insulating layer made of plastic and sprayed on the stator laminations, which extends over the inner side of an axial stator borehole of the stator laminations and, at least in areas, over the front sides of the stator laminations, and with a pivoted rotor shaft which penetrates the axial stator borehole and which is connected with the rotor in a stationary manner on the end opposite the motor flange.

A proposal by the applicant (No. P 34 04 466) concerns an external rotor motor of the type mentioned at the beginning, whose stator laminations have a borehole in the middle, through which extends a rotor shaft, which is attached on one side to a rotor which is constructed in the shape of a bell. The rotor shaft is mounted with bearing elements pressed into ring collars, which are placed in the area of the front side of the stator laminations, of which one is constructed as one piece on the motor flange of the external rotor motor. The ring color has a ring land at the end which projects inward radially and which abuts on a front side of the stator laminations in the area of a borehole penetrating the stator laminations and is gripped from behind by an external flange of a stator bushing pressed into the borehole of the stator laminations so that the motor flange is held on the stator. In this external rotor motor, the problem of removing the heat which arises is solved by making it difficult to remove heat via the bearing elements in that the stator laminations in their inside borehole are surrounded by a sprayed-on, plastic, electrically insulating layer, which, in the area of the front sides of the stator laminations, is converted into a sprayed-on ring collar, in which the bearing elements are placed. This insulating layer acts as thermal insulation so that the high temperatures which arise in the stator during the operation of the motor cannot have an effect on the bearing elements or can have only a limited effect. A removal of the heat which arises in the stator takes place to a large extent via the ring collar which is constructed as one piece on the motor flange and whose front surface abuts on an insulation material-free area of a front side of the stator laminations lying in the vicinity of the stator borehole. The removal of heat thus takes place via the ring collar to the motor flange from which it is removed to the surroundings. The abutting of the ring collar on the stator laminations of the known external rotor motor ensures a good removal of heat, which, however, with a compact motor design, could be even more effective with regard to greater electrical motor efficiencies.

The placing of a flange tube within the stator borehole in an external rotor shaped-pole motor is known from German Pat. No. 21 36 170. This flange tube is screwed to the base plate by means of screws and supports the pressed-on laminations. The shaft in two bearing bushings can pivot within the flange tube. With this known arrangement of flange tube and bearing bushings, the heat which arises in the windings during the operation of the motor is transferred to the flange tube via the stator laminations and is conducted away to the base plate via the flange tube. Since the bearing elements—whether friction bearings or ball bearings—are in direct contact with the flange tube, the elevation in temperature in the flange tube is transferred to the bearing elements. A strong elevation in temperature in the bearing elements, however, is extremely undesireable since, to some extent, this contributes to a substantial reduction in the life of the bearing and thus of the motor. Furthermore, a more thermally stable or heat-resistant oil or grease is needed with an elevated temperature of the bearing. This leads to the result that the motor is more heavily loaded in the cold state because of the increased viscosity of the lubricant so that, under certain circumstances, the desired rpm is attained only after a delay.

The goal of the invention is to create an external rotor motor of the type mentioned at the beginning, in which a reduced bearing temperature and thus an increased life of the bearing is attained because of a more favorable removal of heat.

This goal is attained in accordance with the invention by at least one heat conducting element, which, on one end, meshes in a force locking or form locking manner into the interior of the stator laminations and, on the other end, is connected at the motor flange so that heat can be removed there. This design in accordance with the invention provides for a particularly favorable heat coupling between the stator laminations and the motor flange for a lessening of thermal loading of the bearing elements since the heat conducting element meshes into the interior of the stator lamintations and thus achieves a large-area contact with them so that a very good heat transfer takes place. Such a heat transfer is far more effective than the mere construction of parts of the motor flange on the front side of the stator laminations, as is known from the state of the art. Moreover, the external rotor motor in accordance with the invention has the advantage that the heat conducting element, in addition to its function as a heat conducting bridge, produces a mechanical connection between the stator and the motor flange. In this way, the motor flange is attached to the stator in a very simple and priceworthy manner.

A further development of the invention provides for the construction of the heat conducting element as a threaded screw, which is screwed into a threaded borehole of the stator lamintations. This screw attachment facilitates a simple mounting of the external rotor motor in accordance with the invention without special tools being necessary for the mounting. Moreover, an easily detachable connection between the motor flange and the stator is hereby attained. The threaded screw is preferably screwed in as deep as possible into the laminations in order to be able to underatke as effective as possible a heat removal via its shaft at the motor flange.

Another further development of the invention can provide for constructing as head conducting elements the leakage laminations of the motor used between the pole tips of two opposite stator poles. For this, the leakage lamintations are constructed as bolts and are extended axially, wherein this extension is provided with a thread which meshes into boreholes on the motor flange. The leakage laminations can be fixed in a nonrotatable manner on the stator by means of a head placed at the other end or can also be held on the stator by means of a few welding points.

Another further development of the invention provides for at least one heat conducting strap which, at one end, is located on the motor flange and, on the other end, abuts on the external boundary area of the front side of the stator laminations facing the motor flange. The heat conducting strap can be constructed as a ring land extending coaxially with respect to the rotor shaft. Alternately, several fingerlike heat conducting straps can be provided, which are arranged around the stator borehole. In addition to the heat conducting elements, the heat conducting straps form heat bridges between the stator laminations an the motor flange so that there is a particularly effective heat removal to the outside air. It is advantageous that the heat conducting straps abut on the external boundary area of the corresponding front side of the stator laminations since, in this way, they assume a position on the external periphery of the external rotor motor in accordance with the invention so that a heat release to the outside air can be undertaken effectively since the external areas of the external rotor motor are in direct contact with the outside air and thus a good heat release can take place. In addition to their function as heat bridges, the heat conducting straps are also used as spacers, which keep the motor flange at a distance with respect to the stator laminations in order to have available sufficient space for the stator winding and, in particular, the winding head. Another advantage which should also be stressed is that the ommission of the traditional bearing support known from the state of the art can produce a priceworthy motor which is easy to mount.

Further advantageous developments of the invention are characterized in the subclaims.

Figure 2:
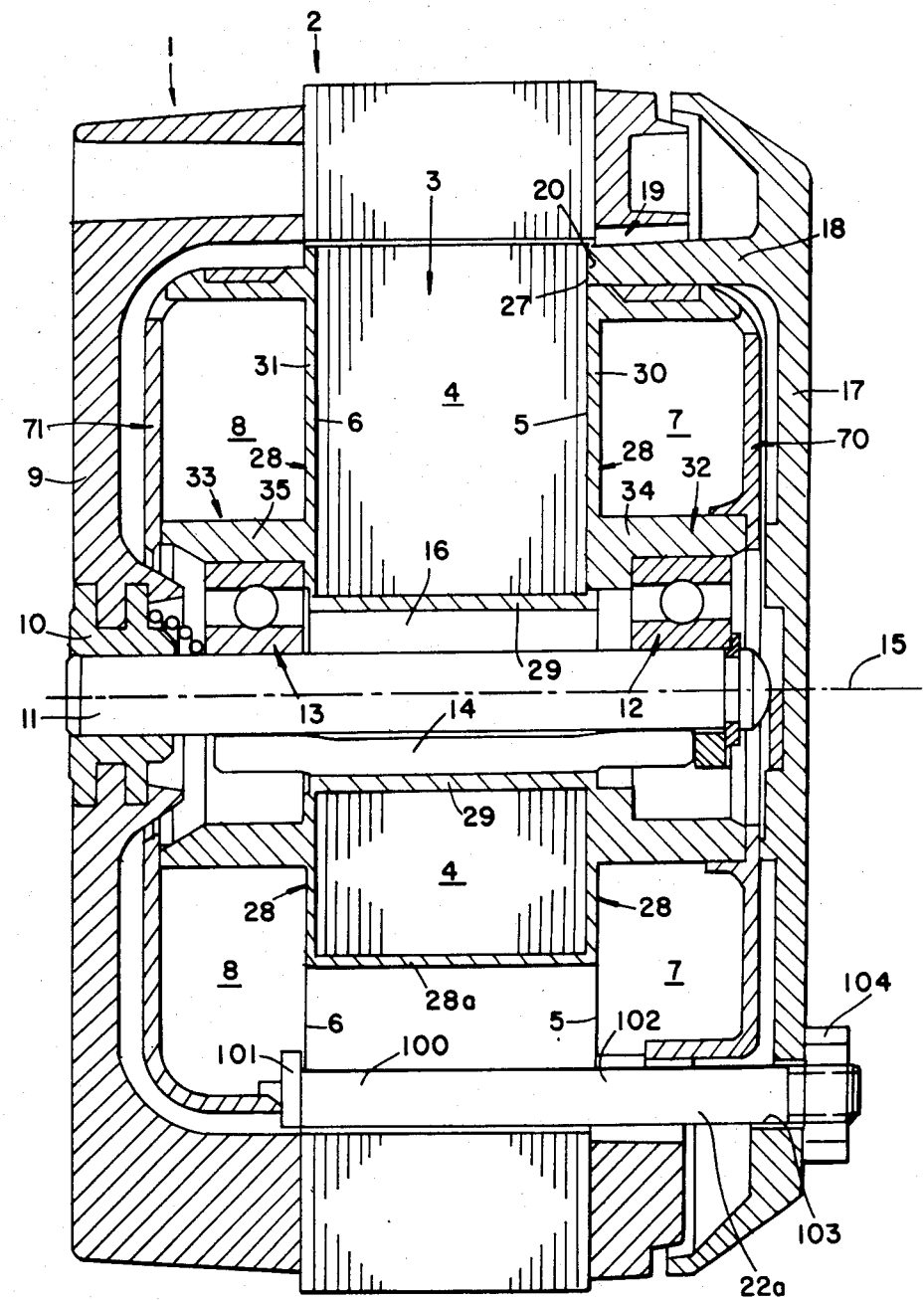

The invention is explained in more detail with the aid of several execution examples illustrated in the attached drawings. The figures show the following:

FIG. 1 shows a sectional view through an external rotor motor in accordance with the invention, wherein a ball bearing is shown in the upper area in accordance with a first alternative embodiment of the invention, and a fricition bearing, in the lower area in accordance with a second alternative embodiment; and FIG. 2 shows an execution example of the motor in accordance with the invention in which the leakage laminations are constructed as a heat conducting element.

In accordance with FIG. 1, the external rotor motor 1, in accordance with the invention, has a rotor 2 and a stator 3, which consists of stator laminations 4 and a stator winding, whose winding heads (not shown) are placed in winding spaces 7, 8 abutting against both sides of the front sides 5, 6 of the stator laminations 4. The rotor 2 has an external rotor bell 9, which is connected with a rotor shaft 11 in a stationary manner by means of a bushing 10. The rotor shaft 11 is pivotable on the stator 3 by means of bearing elements 12 and 13 or 14, wherein in FIG. 1 two different types of bearings of external rotor motor 1 in accordance with the invention are shown—the area of FIG. 1 above the rotation axis 15 shows a first alternative embodiment with a ball bearing (bearing elements 12 and 13) and the area of FIG. 1 below the rotation axis 15, a second alternative embodiment with a friction bearing embodied in the bearing element 14. Since the two execution examples are constructed in an identical manner except for the bearing, the part of the description which does not apply to the bearing is valid for both execution examples. The stator laminations 4 are axially penetrated by the stator bore 16 which is coaxially penetrated by the rotor shaft 11. A motor flange 17, on which the external rotor motor 1 in accrodance with the invention can be attached, is located on the side of the stator 3 opposite the external rotor bell 9.

The motor flange 17 is in contact with the stator laminations 4 via at least one heat conducting element 22a. In accordance with FIG. 1, the heat conducting element 22a is construted as a threaded screw 22. The motor flange 17 has a plate-shaped area in which there is at least one attachment hold 21, which is penetrated by the threaded screw 22, which is screwed on into a threaded borehole 23 constructed in the stator laminations 4. Preferably, several threaded screws 22 placed at a distance from one another are provided, which are used for both the attachment of the motor flange 17 and for the heat removal (because of the drawing of the section, however, only a threaded screw 22 is shown in FIG. 1 and this is shown only in the executon example provided with a friction bearing; the screw attachment of the motor flange 17 described is, however, also valid for the execution example provided with the ball bearing). Preferably, the attachment hole 21 is bored from the external side 23a of the motor flange 17 (countersink borehole 24). The threaded screw 22 has a flat head 25 in the case of a countersink borehole 24 so that the threaded screw 22 does not project beyond the external side 23a of the motor flange 17. The motor flange 17 also has several axially extended fingerlike heat conducting bars 18 separated from one another by gaps, which are preferably arranged in a circle whose center lies on the rotation axis 15 of the rotor shaft 11. The heat conducting bars 18 are constructed in one piece with the motor flange 17 and have front surfaces 20 on their free ends 19, which abut on external, peripheral areas 27 of the front side 5 of the stator laminations 4. Upon screwing the motor flange 17 securely to the stator laminations 4, the heat conducting bars 18 are used as spacers so that there is sufficient space both for the winding heads of the stator winding and for the bearing of the rotor (bearing elements 12 or 14) between the motor flange 17 and the front side 5 of the lamintations 4. Furthermore, upon tightening the threaded screws 22, the heat conducting bars 18 form an opposed bearing so that a firm seating of the motor flange 17 on the stator 3 is attained. It is essential that the threaded screws 22 and the heat conducting bars 18 form additional heat brides between the stator laminations 4 and the motor flange 17, by means of which the heat arising in the stator 3 during the operation of the external rotor motor 1 in accordance with the invention is removed to the outside effectively without a substantial thermal loading of the bearing elements. Preferably, the longitudinal axes 26 of the threaded screws 22 run parallel to the rotation axis 15.

The stator laminations 4 have an electrically insulating layer 28 which is sprayed on and is made of plastic and with an area 29 extends over the inner side of the stator borehole 16 and with an area 30 or 31, over the front sides 5 or 6 of the laminators 4. The areas 30 and 31 are connected with one another in one piece over sections 28a of the insulating layer 28, which are constructed within the stator grooves of the laminations (such a section of the insulating layer inside a stator groove is shown in the lower area of FIG. 1). The insulating layer 28 insulates the stator laminations 4 with respect to the stator winding. Axially extending bearing acceptance elements 32 or 33 are designed as one piece in areas 30 and 31 of the insulating layer 28 and are constructed as ring collars 34 or 35 extending coaxially with respect to the rotation axis 15 of the rotor shaft 11.

The inside diameters of the ring collars 34 and 35 are larger than the inside diameter of the stator borehole 16 so that the inner sides 36 or 37 run staggered and radially toward the outside with respect to the area 29 of the insulating layer 28. The ring collars 34 and 35 are used to accept the bearing elements 12 or 13, which are constructed as ball bearings 38 or 39 (see upper part of FIG. 1). The external rings 40, 41 of the ball bearings 38, 39 abut on the inner sides 36 or 37 of the ring collars 34 or 35 in the clamp fit, wherein the front sides 42 or 43 of the external rings 40 or 41 are supported in the areas 30 or 31 of the insulating layer 28. In addition to the clamp fitting of the external rings 40 and 41, a cementing with the ring collars 34 and 35 can also be provided. The inside rings 44 and 45 of the ball bearings 38 and 39 grip corresponding sections of the rotor shaft 11 in a force locking and form locking manner. This advantageous arrangement of the ball bearings 38 and 39 within ring collars 34 and 35 of the insulating layer 28 facilitates a bearing of the rotor 2 without using a bearing tube or something similar. The construction of the ring collars 34 and 35 take place simultaneously with the spraying of the stator laminations 4 with the insulating layer 28 so that the bearing acceptance parts 32 and 33 of the external rotor motor in accordance with the invention can be produced very economically. This insulating layer effectively suppresses the transfer of the heat formed during the operation of the motor to the bearing elements.

The lower part of FIG. 1 shows an external rotor motor in accordance with the invention in a friction bearing model, wherein the bearing element 14 is constructed as a bearing bushing 46 placed in the clamp fit inside the stator borehole 16 coated with the insulating layer 29. The bearing bushing 46 is made up of sintered material and on both sides, its end areas 47 and 48 project beyond the front sides 5 and 6 of the stator laminations 4. The external jacket surface 49 of the bearing bushing 46 abuts on the area 29 of the insulating layer 28 in the area of the stator laminations 4. Here too a cementing can be carried out in addition to the clamp fitting. The inside surface of the bearing bushing 46 forms the friction bearing 50 and 51 for opposite ends of the rotor shaft 11 inside the end areas 47 and 48. The inside diameter of the inside area of the bearing bushing 46 extends slightly between the end areas 47 and 48 so that a narrow ring slit 52 is created, which serves as a lubricant reservoir for the friction bearings 50 and 51. The sinter matrial of the bearing bushing 46 is preferably soaked with lubricant.

In order to attain an axial fixing of the rotor shaft 11 in the ball bearing model of the external rotor motor in accordance with the invention, a ring groove 55 is constructed on the rotor shaft 11 on the side of the motor flange 17, into which a guard ring 56 is inserted, which abuts on the front surface 57 of the inside ring 44 of the ball bearing 38. In the area of the other end of the rotor shaft 11, a conical sprial spring 57a is located, which is supported on one end on the inside ring 45 of the ball bearing 39 and, on the other end, on the side of the bushing 10 facing the stator 3. The conical spiral spring 57a causes an axial bracing of the rotor shaft 11 and is used for the damping of axial oscillations.

For the axial fixing of the rotor shaft 11 in the friction bearing model of the external rotor motor 1 in accordance with the invention, the end of the rotor shaft 11 on the side of the motor flange is provided with a rounded off front surface 60, which, with the information of a spherical thrust bearing, abuts on a disk 61 made of a highly wear-resistant plastic, which is lcoated in an indentation 62 of the motor flange 17. A butting ring 64 is located between the front surface 63 of the bearing bushing 46 and the guard ring 56 in order to limit the axial play in the other direction. The butting ring 64 is also used to damp axial osciallations.

An insulating cover 70 or 71 is placed on each side of the stator 3 in order to attain an insulation on all sides of the winding heads of the stator winding located in the winding spaces 7 and 8. The covers 70 and 71 have a wall 72 or 73 which extends radially and a ring wall 74 or 75 which extends axially. In the transition area from the radially extending wall 72 or 73 into the axially extending ring wall 74 or 75, each cover 70 or 71 has isolated openings 76 or 77 into which locking fingers mesh 78 or 79, which extend radially and are constructed in one piece with the insulating layer 28. The locking fingers 78 or 79 are preferably located on the external periphery of the areas 30 or 31 of the insulating layer 28. Each locking finger 78, 79 has a latch 80 with a radially extending edge 81, which abuts on the border of the opening 76 or 77 located in the area of the ring wall 74 or 75, so that the cover 70 or 71 is held at the stator 3 of the external rotor motor 1. The covers 70 and 71 have perforations 82 and 83 form a passage for the rotor shaft 11. The radially extending walls 72 and 73 of the covers 70 and 71 are supported axially on the front surfaces 84 or 85 of the ring collars 34 or 35 in the area of the bearing of the external rotor motor 1 in accordance with the invention. Furthermore, a guide lug 86 can be placed on the inner side of the covers 70 or 71 which abuts on the outer side of the ring collars 34 or 35 and forms a guide for the cover 70 or 71 (this is shown in FIG. 1 in the cover 70 of the ball bearing model of the external rotor motor).

The threaded screw 22 is surrounded by a heat insulating sheath 87a, which provides a heat shielding of the threaded screw 22 heated by the stator heat so that the heat cannot reach the interior of the external rotor motor 1 from the shaft 92 of the threaded screw 22, but rather remains within the insulating sheath 87a. The heat insulating sheath 87a consists of two sections, namely a heat insulating sheath section 87 and a heat insulating sheath section 89, which follows. The heat insulating sheath section 87 is constructed in one piece with the insulating layer and is penetrated by a borehole 88, through which extends the threaded screw 22. Following heat insulating sheath section 87 in the direction of the flat head 25 of the threaded screw 22 is the heat insulating section 89, which is constructed in one piece with the cover 70 and is penetrated by a borehole 90, through which extends the threaded screw 22. The heat insulating sheath 87a is used to guide the threaded screw 22. The heat insulating sheath 87a is used to guide the threaded screw 22, in addition to having the heat insulating function and also facilitates its insertion into the threaded borehole 23 of the laminations 4.

FIG. 2 shows another execution example for the removal of heat, in which the leakage laminations 100 of the external rotor motor 1 are constructed as a heat conducting element 22a. The bolt-shaped leakage laminations 100 are inserted between the pole tips of two oposite stator poles of the stator and are held by means of an antirotation lock 101, which abuts on the front side 6 of the stator 3. Pointing in an axial direction with respect to the motor flange 17, there is the extended part 102 of the leakage laminations 100 which projects beyond the stator laminations and is constructed in the shape of a threaded screw, which meshes into a corresponding borehole 103 on the motor flange 17. The attachment of the motor flange 17 takes place with the aid of a nut, wherein the heat conducting straps 18 of the motor flange 17 is supported on the front surface 27 of the stator laminations 4, so that additional heat bridges are formed between the stator laminations 4 and the motor flange 17. Of course, other construction possibilities not shown in the drawings are available for the attachment of this heat conducting element 22a on the stator laminations 4. One possibility is attaching the leakage laminations 100 by means of point welding to the stator laminations so that the antirotation lock 101 can be omitted.

Another possibility is to be found, for example, in constructing the leakage laminations 100 over the width of the stator laminations 4 as a hollow cylinder, which is also attached by means of point welding in the intermediate space between two pole tips of the stator laminations. A threaded screw passed through the borehole 103 of the motor flange 17 meshes into this hollow cylinder and provides for the heat removal to the motor flange and for its attachment.

The other design of the motor in accordance with FIG. 2 corresponds to the one according to FIG. 1 so that other construction details already mentioned there do not have to be mentioned separately and the same parts are provided with the same reference numbers.

I claim:

1. External rotor motor of the kind having an overhung external rotor and a stator connected with a motor flange having an internal side facing the stator and having an external side, the stator having a stator winding and a stator lamination pack, an insulating layer made of platic and sprayed over the inner side of an axial stator bore of the stator lamination pack and, at least in areas, over the front sides of the stator lamination pack, and a rotatable rotor shaft which penetrates the stator bore and is connected with the rotor in a fixed manner on the shaft end opposite the motor flange, said motor characterized by:

at least one metal heat conducting element provided by a bolt which interconnects the stator with the motor flange in good heat transfer relation;

each said bolt extending through a corresponding hole in the motor flange and having a bolt head abutting on the external side of the motor flange;

and each said bolt having a shank engage directly into a hole of the lamination pack, whereby heat is conducted from the stator lamination pack to the motor flange by way of the bolts.

2. The external rotor motor as in claim 1, wherein said bolt and said hole each are threaded, and the threaded bolt directly engages the threaded hole for good heat conduction from the lamination pack into the bolt.

3. External rotor motor according to claim 1, wherein each said bolt has a flat head, which is located in a countersunk borehole of the motor flange.

4. External rotor motor according to claim 1, wherein several said heat conducting elements at a distance from one another are placed around the stator bore.

5. External rotor motor according to claim 1, wherein said motor includes leakage laminations, and said leakage laminations between the pole tips of two opposite stator laminations comprise a heat conducting element extending to said motor flange in good heat-conducting contact therewith.

6. External motor according to claim 1, further comprising at least one heat conducting bar which, on one end, is located on and in good heat conducting relation with the motor flange and, on the other end, abuts on and in good heat conducting relation with an external boundary area of the side of the stator laminations facing the motor flange, so as to form an additional path for conducting heat from the stator to the motor flange.

7. External rotor motor according to claim 6, wherein several said heat conducting bars separated by gaps from one another are located around the stator bore.

8. External rotor motor according to claim 6, wherein said heat conducting bar is constructed in one piece with the motor flange.

9. External rotor motor according to claim 1 further comprising at least one bearing element located on the insulating layer sprayed on the stator laminations for the bearing of the rotor shaft.

10. External rotor motor according to claim 9 wherein the areas of the insulating layer located on the front sides of the stator laminations have a bearing acceptance element for the bearing element.

11. External rotor motor according to claim 9 wherein said bearing element is constructed as a friction bearing and is placed at least partially within the stator bore of the stator laminations covered with the insulating layer.

12. External rotor motor according to claim 11, wherein said bearing element is constructed as a bearing bushing extending through all the stator laminations, the end areas of said bearing bushing forming a friction bearing for the rotor shaft.

13. External rotor motor according to claim 10, wherein said bearing acceptance element is constructed as ring collars extending coaxially with respect to the rotation axis of the rotor shaft.

14. External rotor motor according to claim 13 further comprising two bearing elements which are constructed as ball bearings located on both sides of the stator laminations, said ball bearings comprising external rings located within the ring collars and comprising internal rings of the ball bearings gripping corresponding sections of the rotor shaft.

15. External rotor motor according to claim 1 wherein for the stator winding, an insulation cover is placed on each side of the stator, said insulating cover having a radially extending wall, and an axially extending ring wall.

16. External rotor motor according to claim 15, wherein said insulating cover, for its fastening in the transition from the radially extending wall into the axially extending ring wall, is penetrated by openings, into which mesh a plurality of axially extending locking fingers constructed as one piece with the insulating layer.

17. External rotor motor according to claim 1 the heat conducting element is surrounded by a heat insulating sheath preventing heat transfer from the heat conducting element into the interior of the external rotor motor.

18. External rotor motor according to claim 17, wherein said heat insulating sheath comprises a heat insulating sheath section of the insulating layer and a heat insulating sheat section of the cover.

* * * * *